(12) United States Patent
Pallares Lopez et al.

(10) Patent No.: US 9,077,821 B2
(45) Date of Patent: Jul. 7, 2015

(54) MAXIMIZING END-USER'S QUALITY OF EXPERIENCE WITHIN A MOBILE DATA PLAN

(71) Applicant: TELEFONAKTIEBOLAGET L M ERICSSON (PUBL), Stockholm (SE)

(72) Inventors: Miguel Angel Pallares Lopez, Madrid (ES); Stuart Clark, Santa Clara, CA (US); Pablo Molinero Fernandez, Madrid (ES); Miguel Angel Muñoz De La Torre Alonso, Madrid (ES)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 368 days.

(21) Appl. No.: 13/728,253

(22) Filed: Dec. 27, 2012

(65) Prior Publication Data

US 2014/0187195 A1    Jul. 3, 2014

(51) Int. Cl.
*H04M 11/00* (2006.01)
*H04M 15/00* (2006.01)
*H04L 12/14* (2006.01)

(52) U.S. Cl.
CPC ......... *H04M 15/885* (2013.01); *H04L 12/1407* (2013.01); *H04M 15/66* (2013.01); *H04M 15/70* (2013.01); *H04M 15/725* (2013.01); *H04M 15/73* (2013.01); *H04M 15/76* (2013.01); *H04M 2215/0108* (2013.01); *H04M 2215/0116* (2013.01); *H04M 2215/0132* (2013.01); *H04M 2215/014* (2013.01); *H04L 12/1432* (2013.01)

(58) Field of Classification Search
USPC .................................. 455/406, 405, 423, 433
See application file for complete search history.

(56) References Cited

U.S. PATENT DOCUMENTS 8,880,023 B2 *  11/2014  Goldner et al. ............... 455/406
2013/0091281 A1 *  4/2013  Chai et al. ..................... 709/225

* cited by examiner

*Primary Examiner* — Joseph Arevalo (57) ABSTRACT

Currently existing mechanisms to optimize the quality of experience (QoE) in accordance with user data plans are rather based on user self-managed usage of his mobile user data plan with, for example, help from external applications which continuously evaluate the limits reached. There is thus a need for deployment of intelligence in the network, in order to avoid abrupt downgrades in the QoE for subscribers that go over the monthly quota of their data plan. To overcome these problems, or at least to mitigate them, an embodiment of the present invention provides for an optimization of the user's quota by gradually reducing the required bandwidth for the content that the user requests. This is achieved by a method which takes into account the consumed/remaining volumes in the user data plan as well as the user browsing habits, and which provides context enrichment to content providers to enable taking decisions.

18 Claims, 5 Drawing Sheets

MAXIMIZING END-USER'S QUALITY OF EXPERIENCE WITHIN A MOBILE DATA PLAN

TECHNICAL FIELD

The present invention is related to avoiding downgrades in the Quality of Experience for subscribers that go over their monthly quota of their data plans. (As used herein, references to the "present invention" or "invention" relate to exemplary embodiments and not necessarily to every embodiment encompassed by the appended claims.) More specifically, the present invention is related to avoiding downgrades in the Quality of Experience for subscribers that go over their monthly quota of their data plans by monitoring traffic of a user and determining remaining quota for the user.

BACKGROUND

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

Policy and Charging Control (PCC) architecture permits to integrate both policy and charging control.

Figure 1:
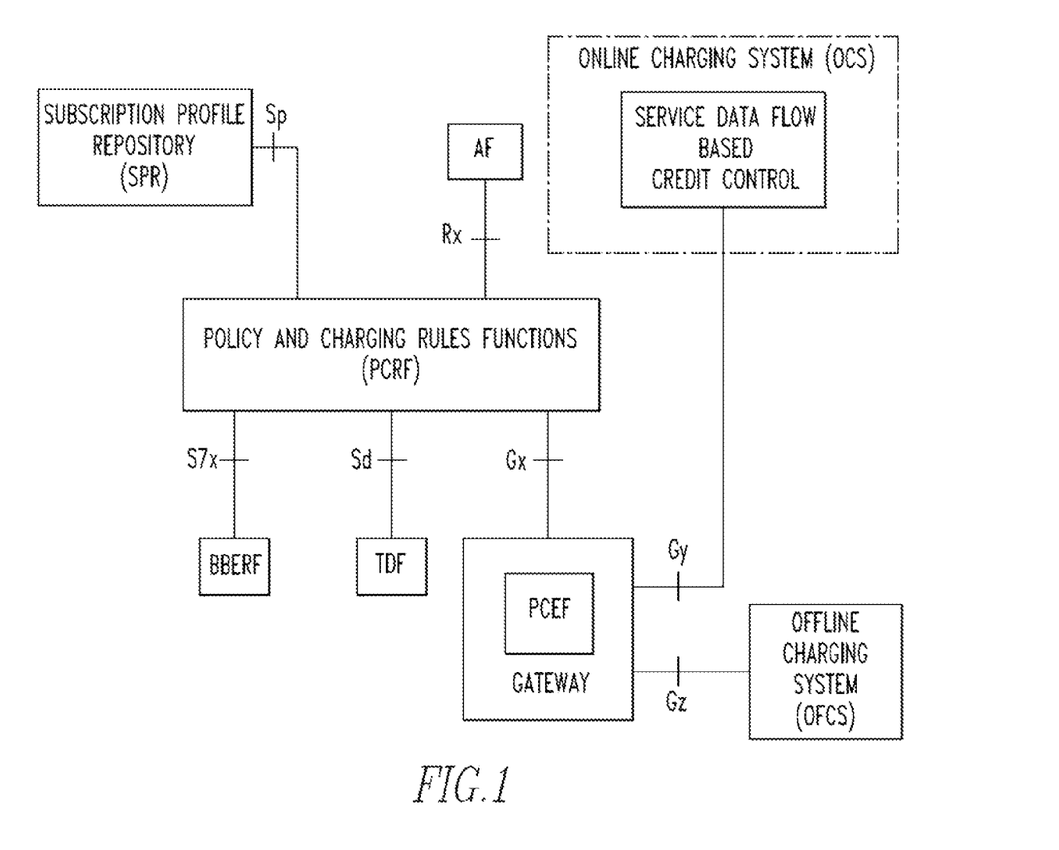
FIG. 1 shows a PCC policy and charging control architecture.

The architecture that supports Policy and Charging Control functionality is depicted in FIG. 1. FIG. 1 has been taken from TS 23.203, which specifies the PCC functionality for Evolved 3GPP Packet Switched domain, including both 3GPP accesses (GERAN/UTRAN/E-UTRAN) and Non-3GPP accesses.

The Gx reference point is defined in 3GPP TS 29.212 and lies between a Policy and Charging Rule Function (PCRF) and a Policy and Charging Enforcement Function (PCEF). The Gx reference point is used for provisioning and removal of PCC rules from the PCRF to the PCEF and for transmission of traffic plane events from the PCEF to the PCRF. The Gx reference point can be used for charging control, policy control or both. Note Gx reference point is generally based on Diameter (RFC 3588).

The Rx reference point is defined in 3GPP TS 29.214 and is used to exchange application level session information between the Policy and Charging Rules Function (PCRF) and an Application Function (AF). An exemplary PCRF is Ericsson Service Aware Policy Controller (SAPC). An exemplary AF is a Proxy Call Session Control Function (P-CSCF) of an IP Multimedia Subsystem (IMS). Note both Gx and Rx reference points are generally based on Diameter (RFC 3588).

DPI (Deep Packet Inspection) technology supports packet inspection and service classification, which consists on IP packets classified according to a configured tree of rules so that they are assigned to a particular service session.

DPI has been standardized in 3GPP Rel11, the so-called Traffic Detection Function (TDF), which can be either stand-alone or collocated with a PCEF, and 3GPP TR 23.813 can be consulted for details. A new reference point (Sd) has been defined between the standalone TDF and the PCRF.

When the DPI function classifies IP packets into services, enforcement actions can be done based on the service detected. One example of enforcement action is Content Enrichment (hereinafter CE), where packets are enriched with specific content, like user identification (e.g. IMSI, MSISDN) or roaming status, so that an Application Server can take decisions based on this information (e.g. deliver content tailored to the specific user). For HTTP protocol, CE consists on inserting new header fields in the HTTP header. CE also applies to other well-known protocols like SIP, SMTP, IMAP, etc.

At present, content delivery servers are used to serve contents to users. Exemplary content delivery servers may be Content Delivery Networks (CDN), Transparent Internet Caches (TIC), transcoding proxies (Transcoder), or Web servers. Specifically, when a user types a URL into his/her browser, the domain name of the URL is translated by a DNS mapping system into the IP address of a content delivery server in charge of serving the content. In order to assign the user to a server, the DNS mapping system may base its answers on historical and current data regarding global network and server conditions. This data is used to select a content delivery server that is located close to the user. Each content delivery server may be part of a CDN cloud, a large global collection of servers deployed in thousands of sites around the world. These servers are responsible for processing requests from nearby users and serving the requested content.

In this respect, a Web page may be regarded as an HTML document, which can include links to multiple objects in multiple locations. These objects are an integral part of the web page content.

Part of the content of web pages is sponsoring the main content of the web page. For example, in the case of a newspaper, the banners might be sponsoring the actual content of the web page (i.e. the news) and the infrastructure to host it.

Much of the content in current Web pages consumes a lot of bandwidth (BW). A typical download from a newspaper site requires 2 Mbytes, out of which only a few hundred Kbytes consist of textual information.

Data plans in mobile networks usually deploy a flat tariff at a given download peak rate until a certain download volume is reached. When the download limit is surpassed, the peak rate is reduced, until next billing period starts (e.g. beginning of next month).

With the introduction of faster 4G HSPA+ and LTE networks and smartphones, the download volume is increasing dramatically and this is severely affecting the data plans set for serving and charging the users.

Much of the content in current web pages includes content that consumes a lot of bandwidth. This may represent a higher use of network resources at the beginning of billing periods and cause frustration for customers when they see their peak bandwidth reduced before the accounting period ends.

There are data plans that are virtually unlimited (i.e. the download volume is not reached) under most usage conditions (e.g. when the mobile connection is not heavily used to download content). There are however others that are not (e.g. in the order of 500 KBytes downloaded before the bandwidth decrease). These are essentially targeting users needing basic connectivity such as reading e-mail and not for those intending to browse intensively.

There is no known mechanism that optimizes the user quality of experience (QoE) in accordance with the user data plan. All the mechanisms described below do not address the problem:

Web browsers currently support options to avoid downloading selected parts of the content. These options are more abundant in web browsers available for desktops than for mobile platforms.

Web servers make use of the information present in the HTTP User-Agent protocol field in order to adapt the characteristics of the downloaded content to the capabilities of the rendering device. The User-Agent is not in general a trusted source of information in order to identify the device originating an HTTP request.

Today, mobile users do adjust their behavior when they are close to hitting their bandwidth limits. Keeping an eye on mobile data plan's monthly limits (and having to deal with the consequences of going over it) is nothing new. Faster speed means there's more time to consume more content, so users must know that old habits may not fit new device's capabilities.

For instance, Netflix auto-detects how much data to send based on a user's connection, so the same movie that you watched on a 3G connection will have higher quality (and greater size) when you watch it on a 4G connection. Instead of using 100 MB to watch Netflix for an hour, you might use 200 MB.

An end-user should make adjustments to what activities are done on a mobile device. HD video streaming and video chat are among the biggest data hogs around. It's probably not a good idea to spend all day on YouTube or Netflix if you have limited data. It might be beneficial to switch to a Wi-Fi network whenever possible.

Hold off on downloading apps over the air or auto-uploading photos. iOS users should limit how many App Store visits they make on an iPhone or iPad not connected to Wi-Fi, and Android users should set auto-downloads to Wi-Fi only (Open Google Play and press Menu>Settings).

iPhone users (there are other applications for Android) have the popular DataMan to track data usage in "real-time," so you get up-to-second monitoring of how much has been consumed. DataMan warns users about exceeding their monthly limits, and has stats that can be exported to figure out where you use data most.

Some wireless carriers also have their own apps that provide access to the subscriber's current of data usage. These apps are more accurate because they use the same accounting as the carrier, which may differ from third-party apps.

Most of the above recommendations are habit-breakers, affecting his quality of experience, as they represent a user self-managed usage of his mobile data plan.

BRIEF SUMMARY OF THE INVENTION

The present invention pertains to a policy and charging rules function server, hereinafter PCRF server, of a telecommunications network having a traffic detection function device, hereinafter TDF device. The PCRF server comprises a network interface unit of the PCRF server which receives a user identifier for a user session and obtains remaining quota and subscriber habits for the user identifier on user session and services sessions basis. The network interface unit submits the remaining quota and subscriber habits on user session and services sessions basis for the user identifier to the TDF device. The network interface unit receives usage monitoring information for the user session and for a particular service session from the TDF device. The PCRF server comprises a processing unit of the PCRF server which re-calculates a new remaining quota and subscriber habits for the user identifier using the usage monitoring information. The network interface unit sending the new remaining quota and subscriber habits for the user identifier to the TDF device; and upon receiving an indication of session termination, the processing unit updates values of remaining quota and subscriber habits for the user identifier to be used for a subsequent user session for the user identifier.

The present invention pertains to a method of PCRF server, of a telecommunications network having a TDF device. The method comprises the step of receiving a user identifier at a network interface unit of the PCRF server for a user session. There is the step of obtaining through the network interface unit remaining quota and subscriber habits for the user identifier on user session and services sessions basis. There is the step of submitting through the network interface unit of the PCRF server the remaining quota and subscriber habits on user session and services sessions basis for the user identifier to the TDF device. There is the step of receiving at the network interface unit of the PCRF server usage monitoring information for the user session and for a particular service session from the TDF device. There is the step of using the usage monitoring information to re-calculate with a processing unit of the PCRF server a new remaining quota and subscriber habits for the user identifier. There is the step of sending from the network interface unit the new remaining quota and subscriber habits for the user identifier to the TDF device. Upon receiving an indication of session termination, there is the step of updating values of remaining quota and subscriber habits for the user identifier to be used for a subsequent user session for the user identifier.

The present invention pertains to a content delivery server of a telecommunications network having a PCRF server, and a TDF device. The content delivery server comprises a network interface unit which receives both remaining quota and subscriber habits for a service session from the TDF device. The content delivery server comprises a processing unit which tailors content to be delivered for the session. The content delivered for the session to a user through the network interface.

The present invention pertains to a TDF device of a telecommunications network having a PCRF server, and a content delivery server. The TDF device comprises a network interface unit of the TDF device which receives a remaining quota and subscriber habits on user session and services sessions basis for a user session identified by a user identifier. The TDF device comprises a memory of the TDF device which stores the remaining quota and subscriber habits on user session and services sessions basis for the user identifier. The TDF device comprises a processing unit of the TDF device which detects a particular service session for the user identifier and determines the remaining quota for the user session and for the particular service session. The network interface unit sends the remaining quota and the subscriber habits to the content delivery server. The processing unit monitoring traffic for the user session and for the particular service session. The network interface unit provides usage monitoring information, which is obtained by monitoring the traffic, for the user session and for the particular service session to the PCRF server, and receives updated remaining quota and updated subscriber habits for the user identifier recalculated by the PCRF server. The memory of the TDF device stores the updated remaining quota and updated subscriber habits for the user identifier.

The present invention pertains to a method of a TDF device of a telecommunications network having a PCRF server, and a content delivery server. The method comprises the steps of receiving at a network interface unit of the TDF device a remaining quota and subscriber habits on user session and services sessions basis for a user session identified by a user identifier. There is the step of storing the remaining quota and subscriber habits on user session and services sessions basis for the user identifier in a memory of the TDF device. There is the step of detecting a particular service session for the user identifier by a processing unit of the TDF device. There is the step of determining by the processing unit of the TDF device the remaining quota for the user session and for the particular service session. There is the step of sending from the network interface unit of the TDF device the remaining quota and the subscriber habits to the content delivery server. There is the step of monitoring with the processing unit of the TDF device traffic for the user session and for the particular service session. There is the step of providing usage monitoring information, which is obtained by monitoring the traffic, for the user session and for the particular service session to the PCRF server. There is the step of receiving at the network interface unit updated remaining quota and updated subscriber habits for the user identifier recalculated by the PCRF server. There is the step of storing the updated remaining quota and updated subscriber habits for the user identifier in the memory of the TDF device.

BRIEF DESCRIPTION OF THE DRAWING

In the accompanying drawings, the preferred embodiment of the invention and preferred methods of practicing the invention are illustrated in which.

DETAILED DESCRIPTION

Figure 3:
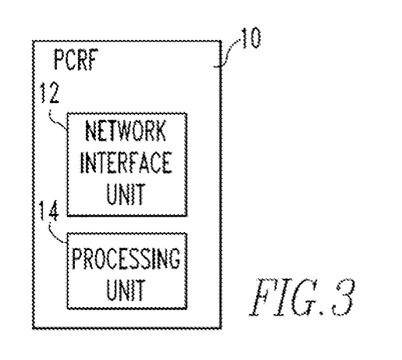
FIG. 3 is a block diagram of a PCRF of the present invention.

Referring now to the drawings wherein like reference numerals refer to similar or identical parts throughout the several views, and more specifically to FIG. 3 thereof, there is shown a PCRF 10 server, of a telecommunications network having a TDF 16 device. The PCRF 10 server comprises a network interface unit 12 of the PCRF 10 server which receives a user identifier for a user session and obtains remaining quota and subscriber habits for the user identifier on user session and services sessions basis. The network interface unit 12 submits the remaining quota and subscriber habits on user session and services sessions basis for the user identifier to the TDF 16 device. The network interface unit 12 receives usage monitoring information for the user session and for a particular service session from the TDF 16 device. The PCRF 10 server comprises a processing unit 14 of the PCRF 10 server which re-calculates a new remaining quota and subscriber habits for the user identifier using the usage monitoring information. The network interface unit 12 sending the new remaining quota and subscriber habits for the user identifier to the TDF 16 device; and upon receiving an indication of session termination, the processing unit 14 updates values of remaining quota and subscriber habits for the user identifier to be used for a subsequent user session for the user identifier.

The network interface unit 12 may obtain from a subscription profile repository, hereinafter SPR, the remaining quota and information related to the subscriber habits, and the processing unit 14 may calculate a value of the subscriber habits from the information. The network interface unit 12 may obtain a user's profile for the user identifier from the SPR, the user's profile including, or submitted along with, the remaining quota and the information related to the subscriber habits. The processing unit 14 may recalculate the value of the subscriber habits for the user identifier taking into account a last time the user identifier connected to the network. The TDF 16 device may be included in, or collocated with, a policy and charging enforcement function device, hereinafter PCEF device, of the telecommunications network. In particular, the network interface unit 12 of the PCRF 10 server may submit the updated value of remaining quota and information related to the subscriber habits to the SPR for usage during a subsequent user session for the user identifier.

Figure 4:
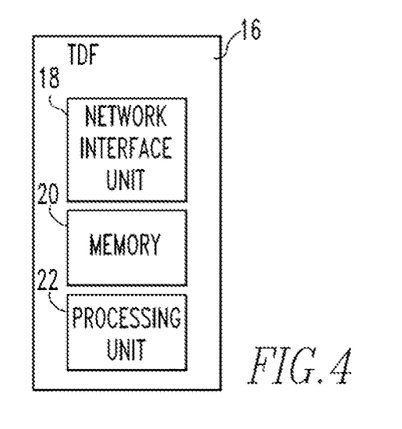
FIG. 4 is a block diagram of a TDF of the present invention.

The present invention pertains to a TDF 16 device, as shown in FIG. 4, of a telecommunications network having a PCRF 10 server, and a content delivery server 24. The TDF 16 device comprises a network interface unit 18 of the TDF 16 device which receives a remaining quota and subscriber habits on user session and services sessions basis for a user session identified by a user identifier. The TDF 16 device comprises a memory 20 of the TDF 16 device which stores the remaining quota and subscriber habits on user session and services sessions basis for the user identifier. The TDF 16 device comprises a processing unit 22 of the TDF 16 device which detects a particular service session for the user identifier and determines the remaining quota for the user session and for the particular service session. The network interface unit 18 sends the remaining quota and the subscriber habits to the content delivery server 24. The processing unit 22 monitoring traffic for the user session and for the particular service session. The network interface unit 18 provides usage monitoring information, which is obtained by monitoring the traffic, for the user session and for the particular service session to the PCRF 10 server, and receives updated remaining quota and updated subscriber habits for the user identifier recalculated by the PCRF 10 server. The memory 20 of the TDF 16 device stores the updated remaining quota and updated subscriber habits for the user identifier.

The TDF 16 device may be included in, or collocated with, a PCEF device, of the telecommunications network. The processing unit 22 may detect the particular service session after an IP connectivity access network session, hereinafter IP-CAN session, is established. The network interface unit 18 may send the updated remaining quota and updated subscriber habits to the content delivery server 24. The content delivery server 24 may be anyone of: content delivery network, hereinafter CDN, transparent Internet cache, hereinafter TIC, transcoder node and web server.

Figure 5:
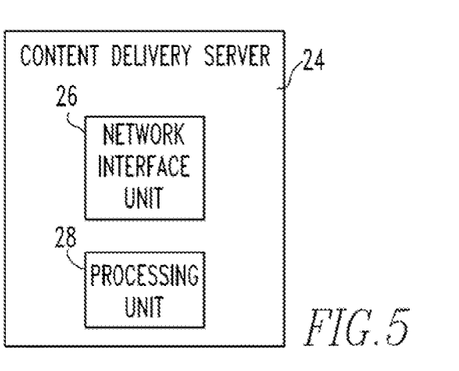
FIG. 5 is a block diagram of a content delivery server of the present invention.

The present invention pertains to a content delivery server 24, as shown in FIG. 5, of a telecommunications network having a PCRF 10 server, and a TDF 16 device. The content delivery server 24 comprises a network interface unit 26 which receives both remaining quota and subscriber habits for a service session from the TDF 16 device. The content delivery server 24 comprises a processing unit 28 which tailors content to be delivered for the session. The content delivered for the session to a user through the network interface. The network interface unit 26 may receive an updated remaining quota and an updated subscriber habits from the TDF 16 device.

The present invention pertains to a method of a PCRF 10 server, of a telecommunications network having a TDF 16 device. The method comprises the steps of receiving a user identifier at a network interface unit 12 of the PCRF 10 server for a user session. There is the step of obtaining through the network interface unit 12 remaining quota and subscriber habits for the user identifier on user session and services sessions basis. There is the step of submitting through the network interface unit 12 of the PCRF 10 server the remaining quota and subscriber habits on user session and services sessions basis for the user identifier to the TDF 16 device.

There is the step of receiving at the network interface unit 12 of the PCRF 10 server usage monitoring information for the user session and for a particular service session from the TDF 16 device. There is the step of using the usage monitoring information to re-calculate with a processing unit 14 of the PCRF 10 server a new remaining quota and subscriber habits for the user identifier. There is the step of sending from the network interface unit 12 the new remaining quota and subscriber habits for the user identifier to the TDF 16 device. Upon receiving an indication of session termination, there is the step of updating values of remaining quota and subscriber habits for the user identifier to be used for a subsequent user session for the user identifier.

The step of obtaining through the network interface unit 12 the remaining quota and the subscriber habits may include the steps of: obtaining from a subscription profile repository, hereinafter SPR, through the network interface unit 12 the remaining quota and information related to the subscriber habits, and the processing unit 14 calculating a value of the subscriber habits from the information. There may be the step of obtaining through the network interface unit 12 a user's profile for the user identifier from the SPR, the user's profile including, or submitted along with, the remaining quota and the information related to the subscriber habits. In particular, there may be the step of submitting from the network interface unit 12 of the PCRF 10 server to the SPR the updated value of remaining quota and information related to the subscriber habits for usage during a subsequent user session for the user identifier.

There may be the step of the processing unit 14 recalculating the value of the subscriber habits for the user identifier taking into account a last time the user identifier connected to the network. The TDF 16 device may be included in, or collocated with, a policy and charging enforcement function device, hereinafter PCEF device, of the telecommunications network.

The present invention pertains to a method of a TDF 16 device, of a telecommunications network having a PCRF 10 server, and a content delivery server 24. The method comprises the steps of receiving at a network interface unit 18 of the TDF 16 device a remaining quota and subscriber habits on user session and services sessions basis for a user session identified by a user identifier. There is the step of storing the remaining quota and subscriber habits on user session and services sessions basis for the user identifier in a memory 20 of the TDF 16 device. There is the step of detecting a particular service session for the user identifier by a processing unit 22 of the TDF 16 device. There is the step of determining by the processing unit 22 of the TDF 16 device the remaining quota for the user session and for the particular service session. There is the step of sending from the network interface unit 18 of the TDF 16 device the remaining quota and the subscriber habits to the content delivery server 24. There is the step of monitoring with the processing unit 22 of the TDF 16 device traffic for the user session and for the particular service session. There is the step of providing from the network interface unit 18 of the TDF 16 device usage monitoring information, which is obtained by monitoring the traffic, for the user session and for the particular service session to the PCRF 10 server. There is the step of receiving at the network interface unit 18 updated remaining quota and updated subscriber habits for the user identifier recalculated by the PCRF 10 server. There is the step of storing the updated remaining quota and updated subscriber habits for the user identifier in the memory 20 of the TDF 16 device.

The TDF 16 device may be included in, or collocated with, a policy and charging enforcement function device, hereinafter PCEF device, of the telecommunications network. There may be the step of the processing unit 22 detecting the particular service session after an IP connectivity access network session, hereinafter IP-CAN session, is established. There may be the step of sending the updated remaining quota and updated subscriber habits from the network interface unit 18 to the content delivery server 24. The content delivery server 24 may be anyone of: content delivery network, hereinafter CDN, transparent Internet cache, hereinafter TIC, transcoder node and web server.

In the operation of the invention, more intelligence is deployed in the network, in order to avoid abrupt downgrades in the QoE for subscribers that go over the monthly quota of their data plan.

To overcome these problems, or at least to mitigate them, the present invention provides for an optimization of the user's quota by gradually reducing the required bandwidth for the content that the user requests. This may be achieved by an exemplary method that takes into account the remaining quota (e.g. remaining volumes) in the user data plan as well as the subscriber habits (e.g. user browsing habits), and that applies the corresponding policies based on PCC rules, e.g. to modify quality of service (QoS), and also provides information by means of CE (e.g. HTTP header enrichment) to content delivery servers 24 (CDN/TIC/Transcoder/Web Server), so that they can take more intelligent decisions regarding service delivery.

More precisely, this exemplary method comprises the steps of:

1. Upon IP-CAN session establishment by a user, a PCEF/TDF node requesting PCC rules by providing a user identifier to a PCRF 10;
2. The PCRF 10 obtaining from a SPR the remaining quota and subscriber habits for the user (on both overall user session and services sessions basis) and submitting the PCC rules and also the remaining quota and subscriber habits (this one, after re-calculation by PCRF 10) for the user identifier to the PCEF/TDF;
3. The PCEF/TDF node activating the PCC rules and storing the remaining quota and subscriber habits for the user identifier (on both overall user session and services sessions basis);
4. Upon detecting a particular service session for the user identifier, the PCEF/TDF node, passing both remaining quota and subscriber habits (for the overall user session or, in case it exists, for that particular service session) to the CDN/TIC/Transcoder node (or directly the Web Server) in charge of providing the particular service, by applying CE (e.g. HTTP header enrichment);
5. The CDN/TIC/Transcoder node (or directly the Web Server) tailoring contents to be delivered for the particular service as indicated by the CE, and providing the tailored contents to the user with the user identifier;
   NOTE: CDN/TIC/Transcoder node can take decisions to enhance the QoE of the end user, like adapting the bandwidth (e.g. by means of transcoding) used by the downloaded content to the situation of the end user mobile data account. It is also possible that the origin Web Server sourcing the content could take those decisions. However, those nodes are usually not under operator's control, so such a solution would be less attractive.
6. The PCEF/TDF monitoring traffic for the overall user session and for the particular service session and requesting new PCC rules by providing the corresponding usage monitoring information to the PCRF 10;
7. The PCRF 10 using the usage monitoring information to re-calculate a new remaining quota and subscriber habits for the user (on both overall user session and particular service session basis), and submitting the new PCC rules and the new remaining quota and subscriber habits for the user to the PCEF/TDF node; and 8. The PCEF/TDF node activating the new PCC rules and storing the new remaining quota and subscriber habits for the user (on both overall user session and particular service session basis) and passing the updated information to the CDN/TIC/Transcoder node (or directly the Web Server). In case a new service is detected, then go to step 4;

9. At IP-CAN session termination, the PCRF 10 node storing in SPR database the updated values of remaining quota and information related to the subscriber habits for the user identifier (on both overall user session and particular service session basis), that will be used for subsequent IP-CAN sessions.

The following options are proposed:
Option 1) TDF Collocated solution (Gx)
Option 2) Standalone TDF solution (Sd)
Option 3) AF based solution (Rx)
Option 1) TDF Collocated Solution (Gx)

This solution applies to 3GPP Rel11 compliant TDF 16 node collocated with the PCEF node (e.g. GGSN or PGW with DPI capabilities).

Figure 2A:
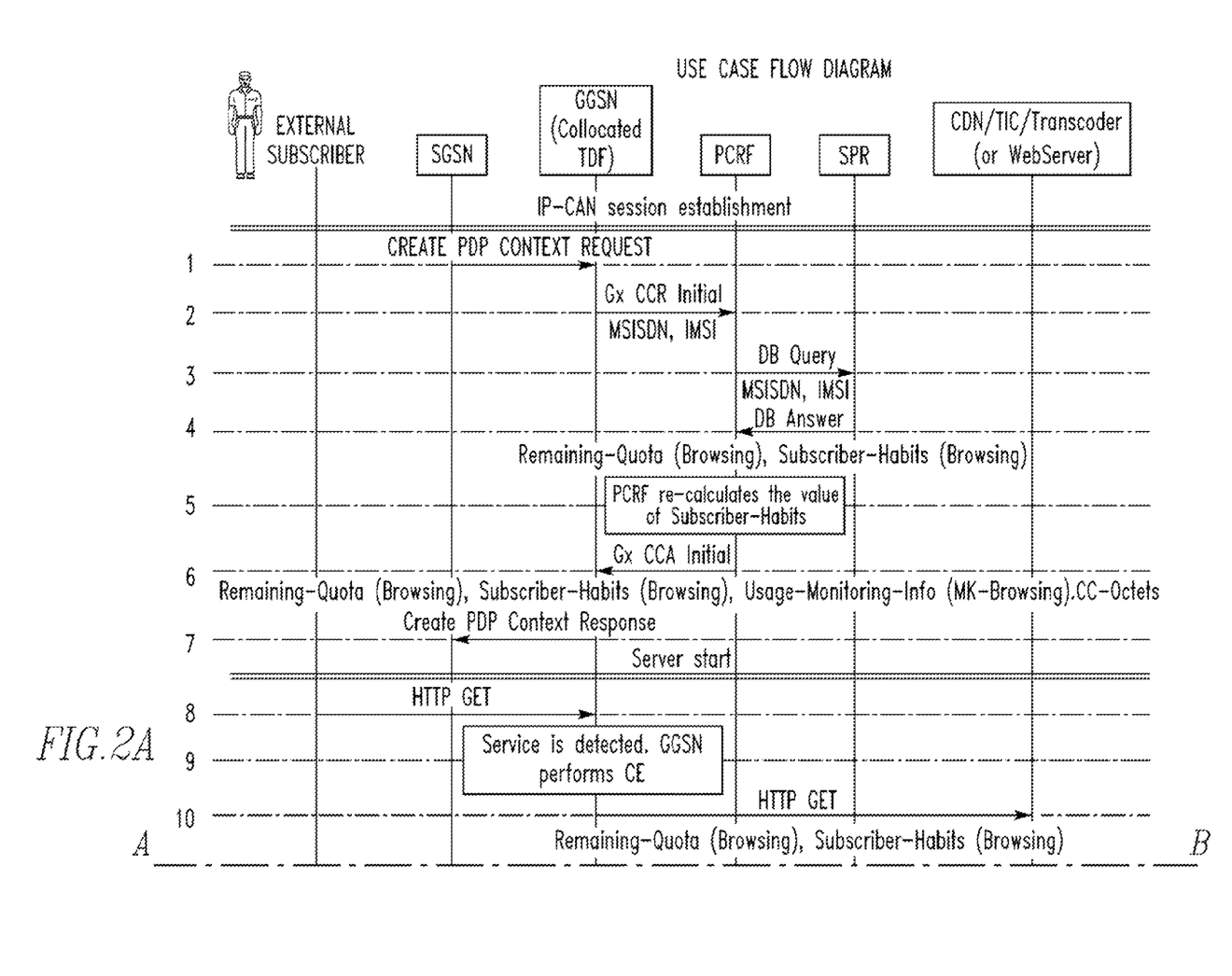
FIGS. 2A, 2B, and 2C (hereafter FIG. 2) collectively show the call flow for Option 1 of the present invention.
Figure 2B:
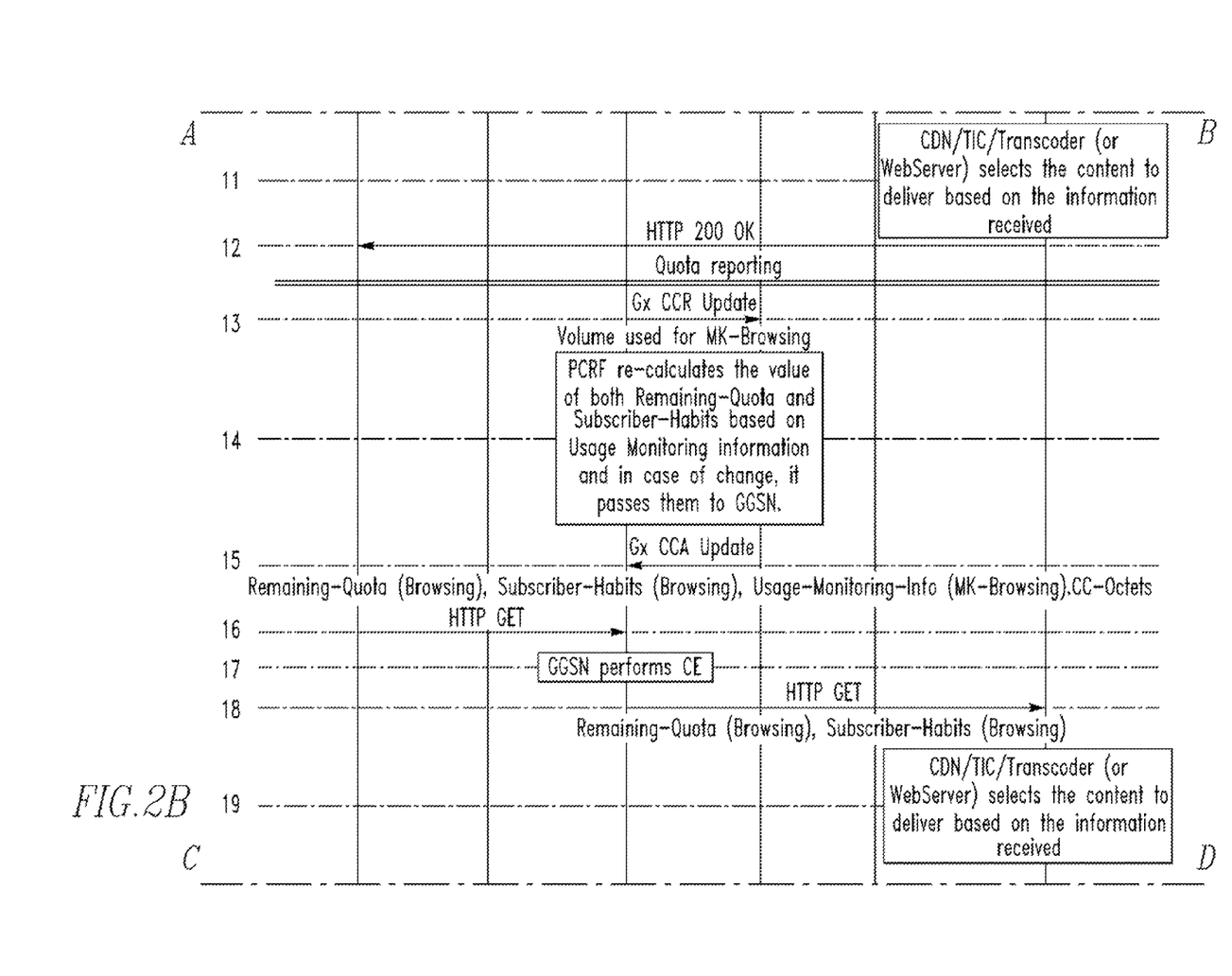
Figure 2C:
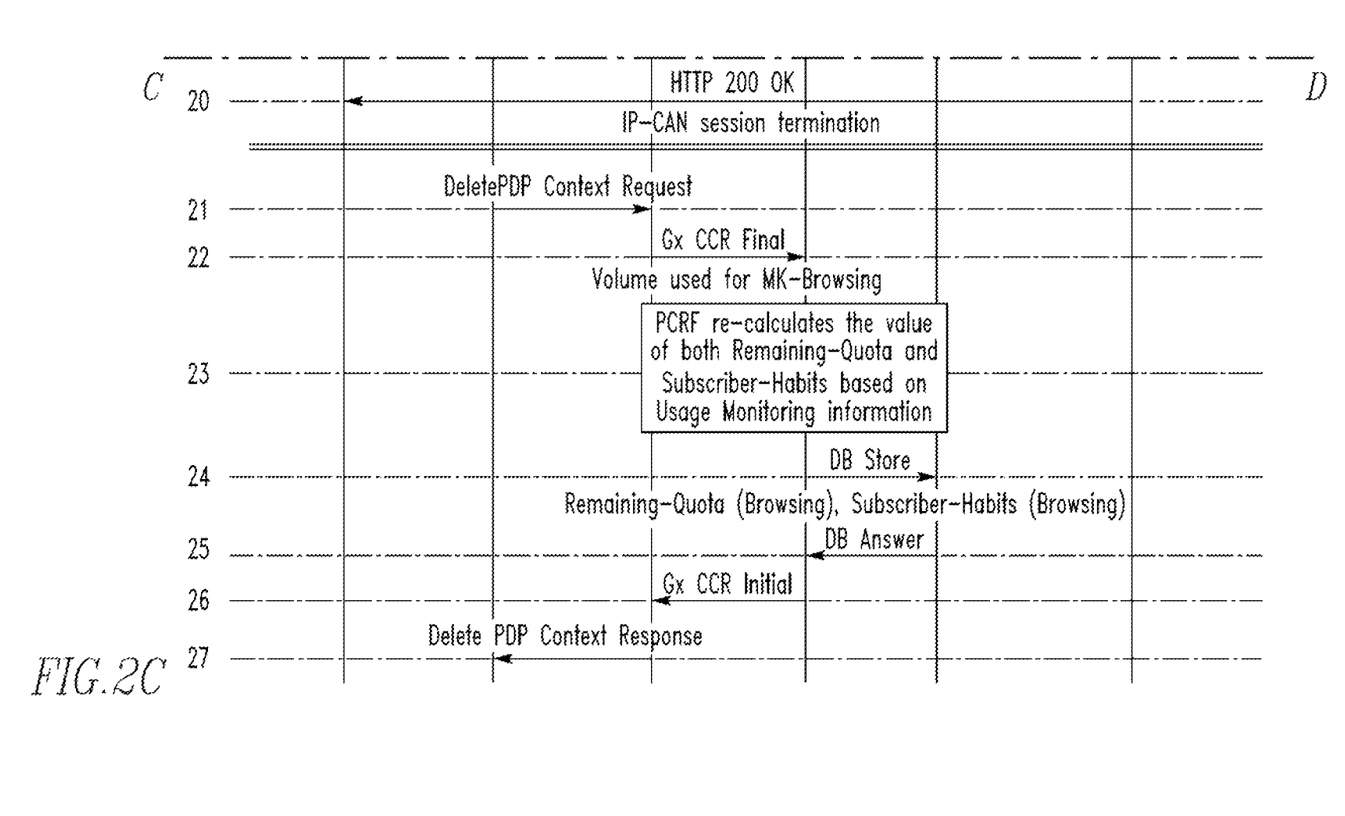

The solution proposed in detailed steps may be as follows (it corresponds to the steps in FIG. 2, which refers to 3G networks, i.e. the PCEF maybe implemented by a GGSN):

Steps 1 and 2) At IP-CAN session establishment (PDP context creation in the figure in case of 3G networks), the PCEF (GGSN) node may convey to PCRF 10 node the user identity (e.g. IMSI or MSISDN) in a Gx initial CCR message. This is as per current standards.

Steps 3 and 4) Based on the received user identity (IMSI or MSISDN), PCRF 10 will retrieve the subscriber's profile from SPR database, specifically the following new parameters (as part of this invention):

The subscriber's remaining quota (e.g. in case of monthly quota, it would be the remaining quota in MB until the end of the month) for both the overall (bearer) session and also for the different subscribed services (if any, this is optional).

Information related to subscriber habits, which can also apply for the overall (bearer) session and also for the different subscribed services (if any, this is optional). See below on how the network can dynamically learn on subscriber habits to categorize the user e.g. in heavy user, medium user or light user. Initially, when the network has no information on the particular subscriber habits, a default value would be stored in SPR (e.g. medium user).

The subscriber habits define how the subscriber "uses" the data network. A subscriber categorized as a heavy user with respect to the overall session is a data hungry user (always connected or connecting several times every day, and for each data session consuming a lot of data, e.g. hundreds of MB per single connection or per day). A subscriber categorized as a light user with respect to the overall session is exactly the opposite (connecting only sporadically, and for each data session consuming a small amount of data, e.g. less than 10 MB per session or per day, e.g. just to check email or social network status). A subscriber categorized as a medium user with respect to the overall session is in between the above categories (connecting only once every day, and for each data session consuming a relatively fair amount of data, e.g. 50 MB per session or per day). The above refers to the overall session (i.e. total amount of data for the sum of all services).

Note the subscriber habits concept also applies on a per service basis. This is to provide more granularity, e.g. the same subscriber can be a YouTube hungry user (consuming hundreds of MB every single day), but instead a Netflix light user (consuming the same amount of data, but during a whole month, instead of in a single day).

NOTE: In FIG. 2, the values for both remaining quota and for subscriber habits refer only to the HTTP browsing service. This is for simplicity reasons, as in a more general case, multiple values would be retrieved from SPR (for the overall session and for each of the subscribed services in the data plan).

Step 5) The PCRF 10 re-calculates the value of the subscriber habits. The reason for this is to have into account the last time the user connected to the network. Imagine the subscriber habits value (for the overall session) retrieved from SPR is equal to "heavy user", but the last connection was made 15 days ago. This implies the user now is not a heavy user at all, so the subscriber habits value might be updated accordingly by the PCRF 10. A detailed algorithm to re-calculate the subscriber habits value is not offered for the sake of simplicity, but just as a very simple example it is disclosed in the following:

If the last connection was made more than 2 days ago, the subscriber habits value retrieved from SPR maybe downgraded by PCRF 10 only one level (e.g. from heavy to medium, and from medium to light; if it was light, it will remain light).

If the last connection was made more than 10 days ago, the subscriber habits value retrieved from SPR maybe downgraded by PCRF 10 two levels (e.g. from heavy to light; if the value was medium, it will be downgraded only one level to light; and if the value was light, it will remain light).

Step 6) The information above will be then passed from PCRF 10 to the PCEF (GGSN) node, that will store it for later use. Passing the remaining quota and subscriber habits (for the overall session and also on a per service basis) is new functionality and not currently defined in standards. Two new AVPs are proposed for this purpose: Remaining-Quota AVP and Subscriber-Habits AVP in the Gx CCA message. The Remaining-Quota AVP maybe of type grouped in order to convey the remaining quota for the global bearer and also for each service (in this last case, including the service identifier). The Subscriber-Habits AVP maybe of type grouped, which in the simplest case will have 3 values: heavy, medium and light user. Note Subscriber-Habits AVP may also apply for the global bearer and also for each service (in this last case, including the service identifier).

NOTE: The above is fully compatible with Usage Monitoring functionality. In case 3GPP Gx Usage Monitoring is active, the quota sent by PCRF 10 to PCEF (GGSN) node for the different monitoring keys (either for the overall/bearer session or on a per service basis, or for both) is handled independently. Typically, the Usage Monitoring quota sent by PCRF 10 is determined by the reporting granularity required by PCRF 10 (e.g. report every 5 MB), while the (new) remaining quota described in the instant specification is the total remaining quota (e.g. for the monthly subscription, the number of remaining MB until the end of the month), not related with the reporting granularity.

Steps 7, 8, 9 and 10) After IP-CAN session is established (step 7), the user starts a service (e.g. HTTP browsing service, step 8). The PCEF (GGSN) node, due to its DPI capabilities, it may detect the service (step 9). As indicated in step 6 before, PCEF (GGSN) node had stored the remaining quota and subscriber habits (for the overall session and also on a per service basis). Two options may turn up here:
- If there is a value of remaining quota and subscriber habits for the particular service detected, only the two parameters for this service maybe passed on to the CDN/TIC/Transcoder node (or directly the Web Server).
- If there is not a value of remaining quota and subscriber habits for the particular service detected, only the two parameters for the overall session maybe passed on to the CDN/TIC/Transcoder node (or directly the Web Server).

In order to pass those parameters from PCEF (GGSN) to CDN/TIC/Transcoder node (or directly the Web Server), content enrichment is proposed. In the example of HTTP browsing service, content enrichment maybe HTTP header enrichment. Specifically, when the PCEF (GGSN) node (with DPI capabilities) detects an HTTP GET message classified in a certain service (e.g. HTTP browsing), it may enrich the HTTP header with the remaining quota and subscriber habits corresponding to that service. Although HTTP header enrichment is a well-known technology, enrichment of such parameters (remaining quota and subscriber habits) is also new and not currently defined in standards. The proposal is to define two new HTTP headers in the HTTP request message (e.g. HTTP GET):

Remaining-Quota: "remaining-quota-value"
Subscriber-Habits: "Heavy|Medium|Light"

NOTE: This example for HTTP header enrichment may apply to HTTP based services, e.g. HTTP browsing services and HTTP based video (e.g. HTTP Progressive Download video technology like the one used in YouTube). For other services (non-HTTP based), other content enrichment techniques may apply, e.g. for email based services, like SMTP or IMAP, it is also possible to enrich the SMTP MAIL message and the IMAP LOGIN message with remaining quota and subscriber habits, so the SMTP/IMAP server receives that information and applies the corresponding logic.

Steps 11 and 12) The CDN/TIC/Transcoder node (or directly the Web Server), when receiving the enriched HTTP GET message, it may deliver the content in the 200 OK response message, but adapted to both the remaining quota and subscriber habits information received. The detailed algorithm running in the CDN/TIC/Transcoder node (or directly the Web Server), to deliver the content to the user based on the received values of remaining quota and subscriber habits, is not offered for the sake of simplicity, but just as an example it is disclosed in the following:

The CDN/TIC/Transcoder node (or directly the Web Server) maybe locally configured with a set of thresholds that may determine how to deliver the content to the end user:

- If the received subscriber habits is light and the received remaining quota is above a certain threshold (locally configured), e.g. 100 MB, the CDN/TIC/Transcoder node (or directly the Web Server) may deliver the content with no limitations at all.
- If the received subscriber habits is light and the received remaining quota is below a certain threshold (locally configured), e.g. 100 MB, the CDN/TIC/Transcoder node (or directly the Web Server) may deliver the content with limitations, e.g. in the case of HTTP browsing service, it may remove Flash content and pictures.
- If the received subscriber habits is medium and the received remaining quota is above a certain threshold (locally configured), e.g. 200 MB (note this threshold is higher in the case of medium user, as the medium user is more data hungry than the light user), the CDN/TIC/Transcoder node (or directly the Web Server) may deliver the content with no limitations at all.
- If the received subscriber habits is medium and the received remaining quota is below a certain threshold (locally configured), e.g. 200 MB (note this threshold is higher in the case of medium user, as the medium user is more data hungry than the light user), the CDN/TIC/Transcoder node (or directly the Web Server) may deliver the content with limitations, e.g. in the case of HTTP browsing service, it may remove Flash content and pictures.
- If the received subscriber habits is heavy and the received remaining quota is above a certain threshold (locally configured), e.g. 500 MB (note this threshold is higher in the case of heavy user, as the heavy user is more data hungry than the medium and light user), the CDN/TIC/Transcoder node (or directly the Web Server) may deliver the content with no limitations at all.
- If the received subscriber habits is heavy and the received remaining quota is below a certain threshold (locally configured), e.g. 500 MB (note this threshold is higher in the case of medium user, as the medium user is more data hungry than the light user), the CDN/TIC/Transcoder node (or directly the Web Server) may deliver the content with limitations, e.g. in the case of HTTP browsing service, it may remove Flash content and pictures.

This is summarized in table below:

TABLE 1

Content delivery actions at CDN/TIC/Transcoder node (or Web Server) based on CE information received.

|  | Remaining-Quota < 100 | 100 < Remaining-Quota < 200 | 200 < Remaining-Quota < 500 | Remaining-Quota > 500 |
|---|---|---|---|---|
| Subscriber-Habits = Light user | Tailored content | Non-tailored content | Non-tailored content | Non-tailored content |
| Subscriber-Habits = Medium user | Tailored content | Tailored content | Non-tailored content | Non-tailored content |
| Subscriber-Habits = Heavy user | Tailored content | Tailored content | Tailored content | Non-tailored content |

Additionally, depending on the particular service, other actions can be done, e.g. for HTTP video services (YouTube) the content could be trans-coded to a lower rate. In general, the information provided (by means of HTTP Header Enrichment or in general CE) to content delivery nodes enables them to take decisions such as content data tailoring (e.g. removing Flash content, pictures or trans-coding actions as mentioned above). All the functionality described here is also new and not currently defined in standards.

Steps 13 and 14) While the service is running, the value of remaining quota and subscriber habits for the service session (and also for the overall user session) is re-calculated by PCRF 10 node, based on service and bearer usage. This may be accomplished by means of activating 3GPP Gx Usage Monitoring for both the service session and the overall user session.

The re-calculation of remaining quota is straightforward, as it simply consists on PCRF 10 subtracting the volume dynamically reported for the Monitoring Key (MK) of the corresponding service session (same for the MK of the overall user session).

The update of subscriber habits is more complex, but it may also be based on the volume dynamically reported for the MK of the corresponding service session (same for the MK of the overall user session). All the functionality described in this bullet is also new and not currently supported in standards. This is how the network exemplarily and dynamically learns the subscriber habits, based on how the subscriber "uses" his/her (mobile broadband) subscription. The detailed algorithm for this is not offered for the sake of simplicity, but just as a very simple example it is disclosed in the following:

If the subscriber habits for the service equals "Light" and the user reports a service volume higher that 50 MB during a single day, the subscriber habits for the service maybe immediately updated to "Medium". The same may apply for the re-calculation of the subscriber habits for the overall user session.

If the subscriber habits for the service equals "Medium" and the user reports a service volume higher that 100 MB during a single day, the subscriber habits for the service maybe immediately updated to "Heavy". The same may apply for the re-calculation of the subscriber habits for the overall user session.

If the subscriber habits for the service equals "Medium" and the user reports a service volume lower than 1 MB during a single day (and this during 3 consecutive days), the subscriber habits for the service maybe immediately updated to "Light". The same may apply for the re-calculation of the subscriber habits for the overall user session.

If the subscriber habits for the service equals "Heavy" and the user reports a service volume lower than 20 MB during a single day (and this during 3 consecutive days), the subscriber habits for the service maybe immediately updated to "Medium". The same may apply for the re-calculation of the subscriber habits for the overall user session.

Steps 15) When any of the values of remaining quota and subscriber habits are updated (i.e. re-calculated as explained in step above), the PCRF 10 node may pass them to the PCEF (GGSN) node in the Gx CCA update message.

Steps 16, 17 and 18) After receiving updated values for remaining quota and subscriber habits from PCRF 10, the updated values maybe conveyed by the PCEF (GGSN) node to the CDN/TIC/Transcoder node (or directly the Web Server), by means of applying CE (HTTP Header Enrichment) to any subsequently detected service request (e.g. HTTP GET in step 16).

Step 19 and 20) Based on the updated values of remaining quota and subscriber habits, the CDN/TIC/Transcoder node (or directly the Web Server) may deliver the tailored content to the user, exactly the same as in Steps 11 and 12.

Steps 21 to 27) At IP-CAN session termination, the PCRF 10 may receive (step 22) the latest volume reported for the service (and bearer session) and based on that, PCRF 10 may re-calculate (following the same procedure as the one explained in Step 14) the remaining quota and subscriber habits (Step 23). PCRF 10 may then store (Step 24) the updated values of remaining quota and subscriber habits in SPR database (as parameters of the subscriber's profile). This way, when a new IP-CAN session is established, the PCRF 10 may download from SPR database the latest value of remaining quota and subscriber habits.

Option 2) Standalone TDF 16 Solution (Sd)

This solution applies to 3GPP Rel11 compliant standalone TDF 16 node which supports the Sd reference point with the PCRF 10.

This solution is the same as the one described in Option 1) above, but using Sd interface between the standalone TDF 16 and the PCRF 10. Specifically, in Step 6) there is a need to define two new AVPs (Remaining-Quota AVP and Subscriber-Habits AVP) in the Sd SER and CCA messages. The definition of both Remaining-Quota AVP and Subscriber-Habits AVP maybe exactly the same as in Gx.

Option 3) AF Based Solution (Rx)

This solution applies to an AF node with DPI capabilities, such as a Service Aware Support Node (SASN) may be, which supports the Rx interface between the AF and the PCRF 10.

This solution is the same as the one described in Option 1) above, but using Rx interface. Specifically, in Step 6) there is a need to define two new AVPs (Remaining-Quota AVP and Subscriber-Habits AVP) in the Rx AAA message. The definition of both Remaining-Quota AVP and Subscriber-Habits AVP maybe exactly the same as in Gx.

The call flow above applies to Option 1 (TDF 16 collocated solution), and for simplicity both remaining quota and subscriber habits apply only for the Browsing service (for this particular subscriber).

The main advantages of the invention are the following:

The operator offers to its mobile data users a service to maximize the perceived value of their data plan within the boundaries of its subscription. The network will automatically optimize subscriber's data plans, and avoid abrupt changes to their QoE (due to the exhaustion of their monthly quota). Abrupt changes in QoE can cause subscriber frustration and therefore subscriber churn.

Enables a new source of revenue for operators, opening a channel for content providers to subsidize the download of certain content to users, without reducing the available bandwidth that users have to download desired content.

ABBREVIATIONS

3GPP Third Generation Partnership Project
AF Application Function
AVP Attribute Value Pair
BW Bandwidth
CCA Credit Control Answer
CCR Credit Control Request
CDN Content Delivery Network
CE Content Enrichment
DPI Deep Packet Inspection
GGSN GPRS Gateway Support Node
HD High Definition
IMSI International Mobile Subscriber Identity
IP Internet Protocol IP-CAN Internet Protocol Connectivity Access Network
MK Monitoring Key
MSISDN Mobile Station Integrated Services Digital Network
MSP Multi Services Proxy
PCC Policy and Charging Control
PCEF Policy and Charging Enforcement Function
PCRF Policy and Charging Rules Function
PDN GW Packet Data Network Gateway
PDP Packet Data Protocol
QoS Quality of Service
RAA Re-Authorization Answer
RAR Re-Authorization Request
SAPC Service Aware Policy Controller
SASN Service Aware Support Node
SER Session Establishment Request
SEA Session Establishment Answer
SPR Subscriber Profile Repository
TDF Traffic Detection Function
TIC Transparent Internet Cache Although the invention has been described in detail in the foregoing embodiments for the purpose of illustration, it is to be understood that such detail is solely for that purpose and that variations can be made therein by those skilled in the art without departing from the scope of the invention except as it may be described by the following claims.

The invention claimed is:

1. A method of a policy and charging rules function server, hereinafter PCRF server, of a telecommunications network having a traffic detection function device, hereinafter TDF device, the method comprising the steps of:
receiving a user identifier at a network interface unit of the PCRF server for a user session;
obtaining through the network interface unit remaining quota and subscriber habits for the user identifier on user session and services sessions basis;
submitting through the network interface unit of the PCRF server the remaining quota and subscriber habits on user session and services sessions basis for the user identifier to the TDF device;
receiving at the network interface unit of the PCRF server usage monitoring information for the user session and for a particular service session from the TDF device;
using the usage monitoring information to re-calculate with a processing unit of the PCRF server a new remaining quota and subscriber habits for the user identifier, wherein the recalculation of subscriber habits takes into account a last time the user identifier connected to the network;
sending from the network interface unit the new remaining quota and subscriber habits for the user identifier to the TDF device; and
upon receiving an indication of session termination, updating values of remaining quota and subscriber habits for the user identifier to be used for a subsequent user session for the user identifier.

2. The method of claim 1, wherein the step of obtaining through the network interface unit the remaining quota and the subscriber habits includes the steps of: obtaining from a subscription profile repository, hereinafter SPR, through the network interface unit the remaining quota and information related to the subscriber habits, and the processing unit calculating a value of the subscriber habits from the information.

3. The method of claim 2 including the step of obtaining through the network interface unit a user's profile for the user identifier from the SPR, the user's profile including, or submitted along with, the remaining quota and the information related to the subscriber habits.

4. The method of claim 1, wherein the TDF device is included in, or collocated with, a policy and charging enforcement function device, hereinafter PCEF device, of the telecommunications network.

5. A method of a traffic detection function device, hereinafter TDF device, of a telecommunications network having a policy and charging rules function server, hereinafter PCRF server, and a content delivery server, the method comprising the steps of:
receiving at a network interface unit of the TDF device a remaining quota and subscriber habits on user session and services sessions basis for a user session identified by a user identifier;
storing the remaining quota and subscriber habits on user session and services sessions basis for the user identifier in a memory of the TDF device;
detecting a particular service session for the user identifier by a processing unit of the TDF device;
determining by the processing unit of the TDF device the remaining quota for the user session and for the particular service session;
sending from the network interface unit of the TDF device the remaining quota and the subscriber habits to the content delivery server;
monitoring with the processing unit of the TDF device traffic for the user session and for the particular service session;
providing a usage monitoring information for the user session and for the particular service session to the PCRF server;
receiving at the network interface unit updated remaining quota and updated subscriber habits for the user identifier recalculated by the PCRF server, wherein the updated subscriber habits take into account a last time the user identifier connected to the network; and
storing the updated remaining quota and updated subscriber habits for the user identifier in the memory of the TDF device.

6. The method of claim 5, wherein the TDF device is included in, or collocated with, a policy and charging enforcement function device, hereinafter PCEF device, of the telecommunications network.

7. The method of claim 5 including the step of the processing unit detecting the particular service session after an IP connectivity access network session, hereinafter IP-CAN session, is established.

8. The method of claim 5 including a step of sending the updated remaining quota and updated subscriber habits from the network interface unit to the content delivery server.

9. The method of claim 5, wherein the content delivery server is anyone of: content delivery network, hereinafter CDN, transparent Internet cache, hereinafter TIC, transcoder node and web server.

10. A policy and charging rules function server, hereinafter PCRF server, of a telecommunications network having a traffic detection function device, hereinafter TDF device, the PCRF server comprising:
a network interface unit of the PCRF server which receives a user identifier for a user session and obtains remaining quota and subscriber habits for the user identifier on user session and services sessions basis, the network interface unit submitting the remaining quota and subscriber habits on user session and services sessions basis for the user identifier to the TDF device; the network interface unit receiving usage monitoring information for the user session and for a particular service session from the TDF device; and a processing unit of the PCRF server re-calculating a new remaining quota and subscriber habits for the user identifier using the usage monitoring information, wherein the recalculation of subscriber habits takes into account a last time the user identifier connected to the network, the network interface unit sending the new remaining quota and subscriber habits for the user identifier to the TDF device; and upon receiving an indication of session termination, the processing unit updating values of remaining quota and subscriber habits for the user identifier to be used for a subsequent user session for the user identifier.

11. The PCRF server of claim 10, wherein the network interface unit obtains from a subscription profile repository, hereinafter SPR, through the network interface unit the remaining quota and information related to the subscriber habits, and the processing unit calculating a value of the subscriber habits from the information.

12. The PCRF server of claim 11 wherein the network interface unit obtains a user's profile for the user identifier from the SPR, the user's profile including, or submitted along with, the remaining quota and the information related to the subscriber habits.

13. The PCRF server of claim 10, wherein the TDF device is included in, or collected with, a policy and charging enforcement function device, hereinafter PCEF device, of the telecommunications network.

14. A traffic detection function device, hereinafter TDF device, of a telecommunications network having a policy and charging rules function server, hereinafter PCRF server, and a content delivery server, the TDF device comprises:

a network interface unit of the TDF device which receives a remaining quota and subscriber habits on user session and services sessions basis for a user session identified by a user identifier;

a memory of the TDF device which stores the remaining quota and subscriber habits on user session and services sessions basis for the user identifier;

a processing unit of the TDF device which detects a particular service session for the user identifier and determines the remaining quota for the user session and for the particular service session;

the network interface unit sends the remaining quota and the subscriber habits to the content delivery server;

the processing unit monitoring traffic for the user session and for the particular service session;

the network interface unit provides usage monitoring information for the user session and for the particular service session to the PCRF server, and receives updated remaining quota and updated subscriber habits for the user identifier recalculated by the PCRF server, wherein the updated subscriber habits take into account a last time the user identifier connected to the network; and the memory of the TDF device stores the updated remaining quota and updated subscriber habits for the user identifier.

15. The TDF device of claim 14, wherein the TDF device is included in, or collocated with, a policy and charging enforcement function device, hereinafter PCEF device, of the telecommunications network.

16. The TDF device of claim 14 wherein the processing unit detects the particular service session after an IP connectivity access network session, hereinafter IP-CAN session, is established.

17. The TDF device of claim 14 wherein the network interface unit sends the updated remaining quota and updated subscriber habits to the content delivery server.

18. The TDF device of claim 14, wherein the content delivery server is anyone of: content delivery network, hereinafter CDN, transparent Internet cache, hereinafter TIC, transcoder node and web server.

* * * * *